US009180465B1

(12) United States Patent
Ambs

(10) Patent No.: US 9,180,465 B1
(45) Date of Patent: Nov. 10, 2015

(54) FOREIGN OBJECT BARRIER DEVICE FOR BULK MATERIAL CONVEYING DUCTS

(71) Applicant: Richard W. Ambs, Williamsport, PA (US)

(72) Inventor: Richard W. Ambs, Williamsport, PA (US)

(73) Assignee: THE YOUNG INDUSTRIES, INC., Muncy, PA (US)

( * ) Notice: Subject to any disclaimer, the term of this patent is extended or adjusted under 35 U.S.C. 154(b) by 42 days.

(21) Appl. No.: 14/256,371

(22) Filed: Apr. 18, 2014

(51) Int. Cl.
*B65G 53/38* (2006.01)
*B03C 1/30* (2006.01)
*B03C 1/26* (2006.01)

(52) U.S. Cl.
CPC .... *B03C 1/30* (2013.01); *B03C 1/26* (2013.01)

(58) Field of Classification Search
USPC ......... 406/55, 91, 94, 191; 209/225, 147, 644
See application file for complete search history.

(56) References Cited

U.S. PATENT DOCUMENTS 4,319,989 A * 3/1982 Wyland et al. ................ 209/225
5,101,977 A * 4/1992 Roman ............................. 209/3
5,469,783 A * 11/1995 Fry ................................. 100/49
5,570,170 A * 10/1996 Muranyi et al. ............... 399/262
5,740,919 A * 4/1998 Stowe ........................ 209/223.1
6,485,284 B1 * 11/2002 Rowland et al. ................ 425/78
7,658,291 B2 * 2/2010 Valerio ......................... 209/559
7,943,043 B2 * 5/2011 Yamasaki ..................... 210/222
2010/0141013 A1 * 6/2010 Lahr .............................. 299/16
2010/0254790 A1 * 10/2010 Tkachyk ....................... 414/311
2014/0083916 A1 * 3/2014 Rossen ......................... 209/644
2015/0041373 A1 * 2/2015 Wolf ............................ 209/644

* cited by examiner

*Primary Examiner* — Joseph Dillon, Jr.

(74) *Attorney, Agent, or Firm* — Novak Druce Connolly Bove + Quigg LLP

(57) ABSTRACT

A device for conveying a fine bulk material including a housing with an opening therethrough for conducting such material; at least one conduit spanning such opening having a set of spaced openings along the length thereof, and connectable to a fluid pressure source; a member of porous material overlying a portion of such conduit, including end portions secured to such conduit and an intermediate portion spaced from such conduit, providing a chamber intercommunicating the openings in such conduit and the pores of such overlying member; and a magnetic bar disposed in such conduit provides a passageway between such fluid pressure source and such conduit openings.

20 Claims, 2 Drawing Sheets

FOREIGN OBJECT BARRIER DEVICE FOR BULK MATERIAL CONVEYING DUCTS

This invention relates to a device disposable in a duct conveying a fine bulk material, functional to preclude the passage of tramp articles including ferrous bulk and particulate materials. This application is a continuation-in-part of U.S. patent application Ser. No. 13/313,239, filed Dec. 7, 2011, incorporated herein by reference.

BACKGROUND OF THE INVENTION

In various industrial processes, it often is provided to gravity feed fine bulk material through ducts to various types of equipment including valves, mixers, grinders, screeners, storage vessels, receptacles and the like. Often such ducts are provided with various forms of barriers to prevent the passage of unintended items such as tools, machine parts, tramp materials and possibly interrupting or deterring the flow of the material being processed, contaminating such material, damaging downline equipment and potentially injuring operating personal. It has been found, however, that such prior art devices are not sufficiently effective in precluding the passage of a broad scope of undesirable objects or accommodating the removal of a number of such items. Accordingly, it is the principal object of the present invention to provide a device disposable in a duct conveying a fine bulk material which is effective in not only screening a greater form of articles but accommodating in the removal of a number of such articles.

SUMMARY OF THE INVENTION

The principal object of the present invention is achieved by providing a device disposable between upstream and downstream components conveying a fine bulk material comprising a housing displaceable between such components openings, having an opening therethrough for conducting such fine bulk materials; at least one conduit supported at the ends thereof on a first pair of spaced portions of such housing opening and spaced from a second pair of spaced portions of such housing, having a set of spaced openings disposed along a surface thereof, and connectable to a source of fluid under pressure; a member of porous material overlying a portion of such conduit, including end portions secured to side portions of such conduit and an intermediate portion spaced from such conduit, providing a chamber intercommunicating such spaced openings along the surface of such conduit and the pores of such overlying member; and a magnetic bar disposed in such conduit, supported therein in a manner providing a fluid passageway between a fluid inlet and the openings in such conduit. In the preferred embodiment of the invention, such conduit and the overlying member secured thereto are formed of a non-magnetic material, the magnetic bar is supported concentrically in such conduit providing an annular passageway therebetween, forming a passageway between the fluid inlet of the conduit and the openings along the length thereof, and such housing is provided with means for readily inserting and removing such magnetic bar, accommodating the removal of magnetically attracted and deposited articles.

DETAILED DESCRIPTION OF THE PREFERRED EMBODIMENT OF THE INVENTION

Figure 1:
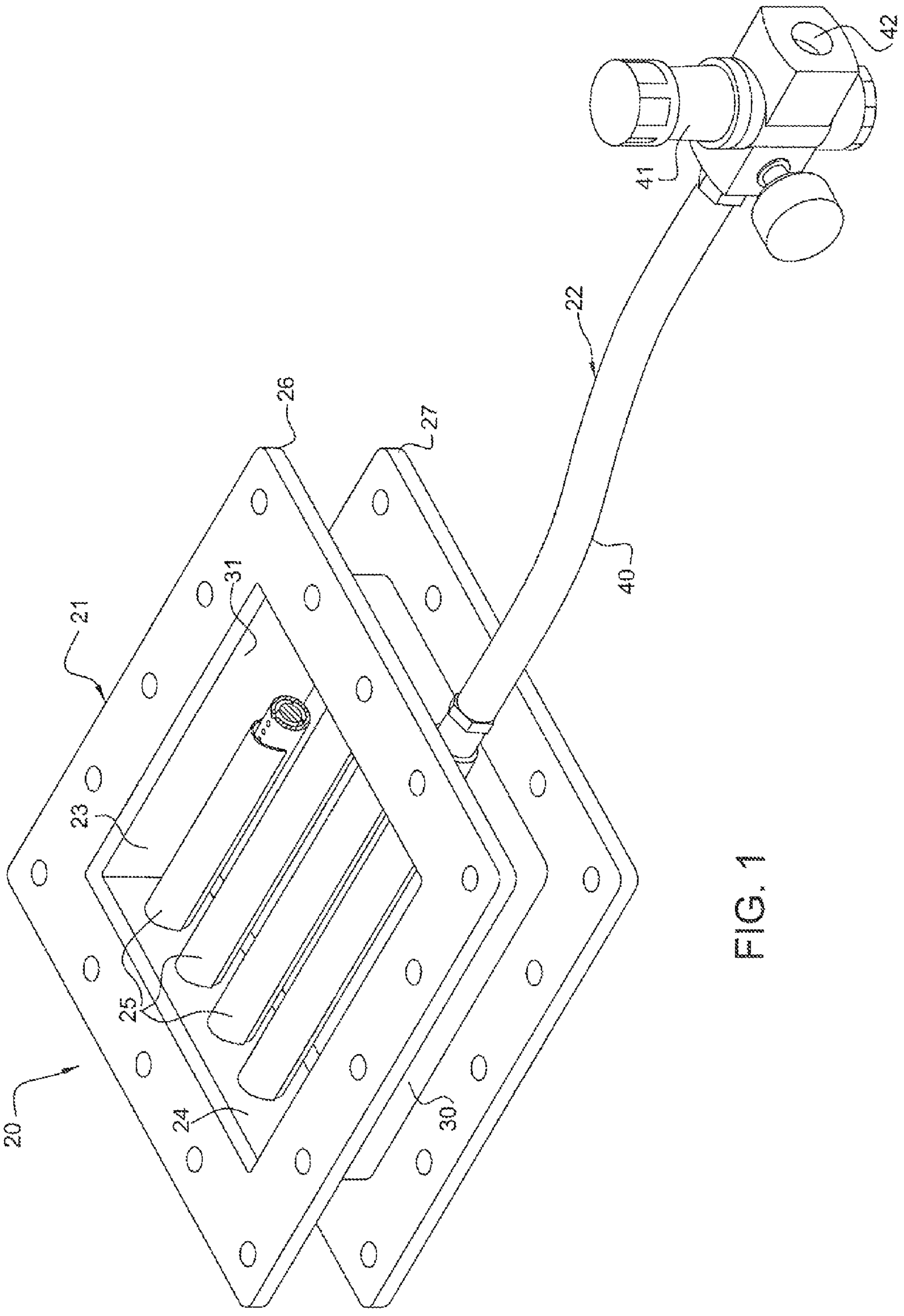
FIG. 1 is a perspective view of a device embodying the present invention.
Figure 2:
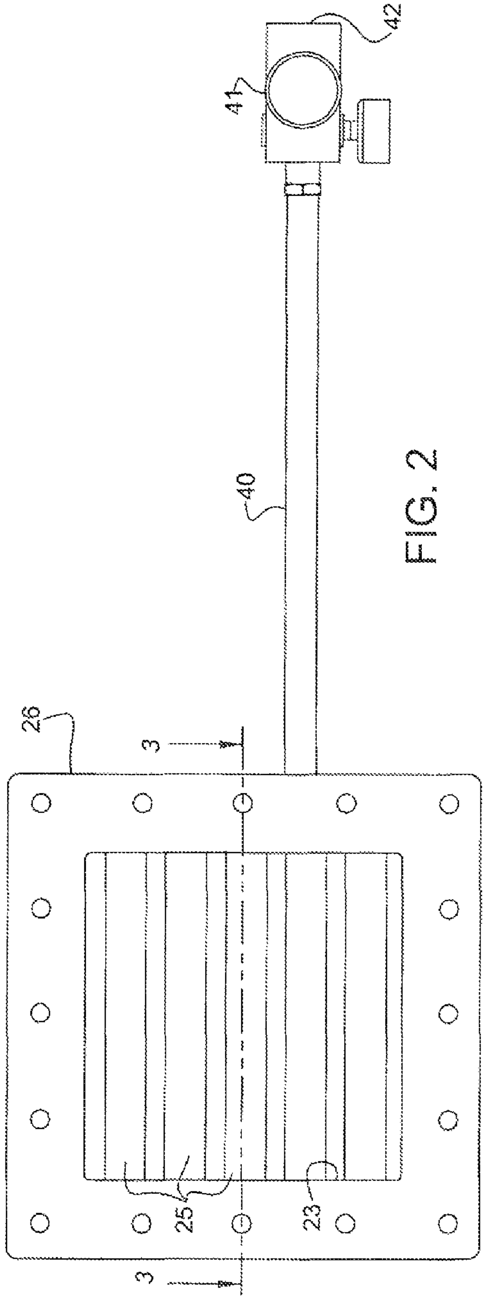
FIG. 2 is a top plan view of the device shown in FIG. 1.
Figure 4:
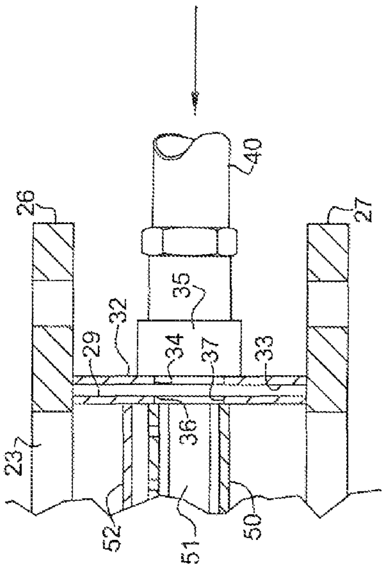
FIG. 4 is an enlarged, fractional view of a portion of the device shown in FIG. 3.
Figure 3:
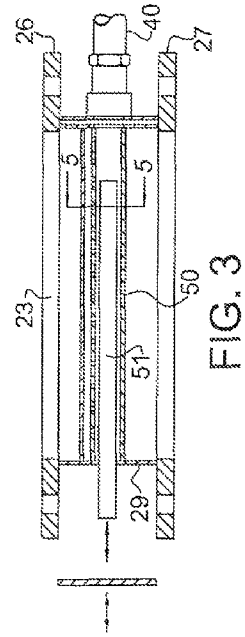
FIG. 3 is a cross-sectional view taken along line 3-3 in FIG. 2.

Referring to FIGS. 1 through 4, there is illustrated a device 20 embodying the present invention which includes an assembly 21 having an opening therethrough for conducting a flow of fine bulk material, and an assembly 22 for supplying a fluid under pressure to the housing of assembly 21. Assembly 21 includes a peripheral wall 23 defining a through opening 24, a set of spaced grates 25 mounted at the ends thereof on peripheral wall 23, spanning through opening 24 and a pair of spaced mounting flanges 26 and 27. Peripheral wall 23 is substantially rectangularly configured including a pair of spaced end walls 28 and 29 as best shown in FIGS. 3 and 4 and a pair of spaced side walls 30 and 31 interconnecting end walls 28 and 29 defining opening 24. Mounting flanges 26 and 27 are disposed in spaced, substantially parallel planes and are secured to upper and lower ends of the peripheral walls. Such walls and flanges are formed of a rigid, non-magnetic material. As best seen in FIGS. 3 and 4, a wall member 32 is provided between portions of mounting flanges 26 and 27, spaced from housing end wall 29, having side end portions bent and secured to housing end wall 29 and flanges 26 and 27 to provide a manifold 33 between housing wall 29 and wall member 32.

As best shown in FIG. 4, wall member 32 is provided with a port 34 communicating with manifold 33, and a connecting fixture 35 communicating with port 34. Housing end wall 29 is provided with a plurality of laterally spaced ports 36.

Fluid supply assembly 22 includes a fluid line 40 provided with a regulator 41 having an inlet 42. Fluid line 40 is detachably connectable to fixture 35. Inlet 42 of regulator 41 is adapted to be connected to a source of fluid under pressure such as a compressor to provide fluid under regulated pressure through fluid line 40 to manifold 33 and ports 36.

Figure 5:
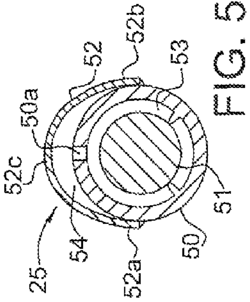
FIG. 5 is an enlarged cross sectional view taken along line 5-5 in FIG. 3.

Referring to FIG. 5, each grate 25 includes a conduit 50, a magnetic bar 51 and an overlying porous member 52. Conduit 50 is cylindrical and formed of a non-magnetic material. It has a length spanning housing opening 24, having an end thereof received in or otherwise supported on a housing end wall 29, communicable with a port 36, and an opposite end thereof similarly received in or otherwise supported on end wall 28, communicable with a closable port in such end wall. Disposed along the length of an upper side of conduit 50 is a plurality of openings 50*a*. Insertable through a closable opening in housing end wall 28, into conduit 50, is a substantially cylindrical magnetic bar 51. Such bar has a length no greater than the length of conduit 50 and a diameter less than the inner diameter of conduit 50. Disposed either on the interior of conduit 50 and/or the exterior of bar 51 are means which provide for spacing bar 51 relative to conduct 50 to provide an annular spacing therebetween when such bar is inserted in such conduit, further providing an annular fluid passageway 53 intercommunicating a port 36 in housing end wall 29 and openings 50*a* along the upper side of conduit 50. Member 52 is formed of a rectangular piece of a multi-layered mesh material of a type manufactured and sold by The Young Industries, Inc. of Muncy, Pa. under the trademark TRANS-FLOW, bent about a longitudinal line to provide a relatively annular cross sectional configuration. Such member also is formed of a non-magnetic material and is disposed in overlying relation to conduit 50 with the side end portion 52*a* and 52*b* thereof secured to the side portions of conduit 50 and with an intermediate, curved portion 52*c* spaced from an upper portion of conduit 50 including openings 50*a*, providing a space 54 therebetween. Preferably, the ends of overlying member 52 engage the inner sides of housing end walls 28 and 29 to close space 54.

In the use of the device as described, the device is installed between an outlet opening or duct of an overhead source of fine bulk material and an inlet opening or a duct of a lower disposed valve, mixer, grinder, screener, storage vessel, receptacle and the like, allowing such elevated bulk material to gravity flow through the device. Prior to initiating the flow of material through the device, assembly 22 is connected to a source of air under pressure, air under pressure is introduced under pressure and an appropriate pressure is set through the use of the regulator. Under such conditions, air under pressure flows through manifold 33, ports 36 in end wall 29, annular passageways 53, openings 50*a*, spaces 54 and the interstices of members 52, into housing opening 24. With air thus injected into device 20, suitable controls are operated to allow the gravity flow of the fine bulk material being processed or simply conveyed, through housing opening 24. As such bulk material flows through the device, captured magnetic/ferrous tramp bodies entrained in the bulk material flowing through the device are attracted and retained by the force of the magnetic attraction of rods 51. As such ferrous objects are restricted or retained, air under pressure applied to the device precludes the accumulation and blockage of the interstices of grate members 52. Periodically, the bulk material feed component may be displaced to provide access to the upper end of the device for the removal of captured tramp articles including ferrous bulk bodies and particles resting on the grates. To facilitate the removal of such ferrous items, the magnetic bars disposed in the grates and exerting an attractive force on such items may be removed from the grates through the openings provided in housing end wall 28. Upon removal of such tramp materials, the device may be reconnected to the bulk material feeding means, the magnetic bars may be reinserted in the conduits of the grates and operation of the device may be resumed in the manner as described.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A device disposable between upstream and downstream components conveying a fine bulk material, comprising:

a housing having an opening therethrough for conducting said fine bulk material;

at least one conduit supported at the ends thereof on a first pair of spaced portions of said housing opening and spaced from a second pair of spaced portions of said housing opening, having a set of spaced openings disposed along a surface thereof and connectable to a source of fluid under pressure;

a member of porous material overlying a portion of said conduit provided with said set of spaced openings, including end portions secured to side portions of said conduit and an intermediate portion spaced from said conduit, providing a chamber intercommunicating said spaced openings along the surface of said conduit and the pores of said overlying member; and a magnetic bar disposed in said conduit, supported therein in a manner providing a fluid passageway between a fluid inlet and said openings of said conduit.

2. The device of claim 1 wherein said conduit and said overlying member er are formed of a non-magnetic material.

3. The device of claim 2 wherein said housing is formed of a non-magnetic material.

4. The device of claim 1 wherein said housing, conduit and overlying member are formed of austenitic stainless steel.

5. The device of claim 1 wherein said overlying member is welded to said conduit.

6. The device of claim 1 wherein said magnetic bar is cylindrical and disposed concentrically in said conduit providing an annular spacing between said conduit and said inserted magnetic bar defining said passageway between said inlet and outlets of said conduit.

7. The device of claim 1 wherein said overlying member is formed of a rigid material allowing the passage of fluid under pressure, aerating and deflecting fine non-magnetic material and trapping ferrous fine and tramp materials.

8. The device of claim 2 wherein said porous member is formed of a multi-layered wire mesh provided with a finished contact surface.

9. The device of claim 1 wherein a cross-sectional configuration of said overlying member is arcuate.

10. The device of claim 1 wherein said housing includes means for inserting and removing said magnetic bar relative to said conduit.

11. The device of claim 1 wherein said housing is provided with at least one mounting flange circumscribing the opening therein, connectable to a flange of another material guidance member.

12. The device of claim 1 including a conduit connected to said housing, communicable with said conduit for supplying a fluid under pressure.

13. The device of claim 12 wherein said fluid supply conduit includes a pressure regulator.

14. The device of claim 1 including a plurality of said conduits, spaced transversely in said housing opening with each being provided with an overlying porous member and at least one being provided with an inserted magnetic bar.

15. The device of claim 14 wherein said housing is provided with a manifold provided with a fluid inlet port and a plurality of outlet ports communicating with the inlet ports of said conduits for supplying fluid under pressure to said conduits.

16. The device of claim 15 including a fluid supply line connected to said inlet part of said manifold and connectable to a source of fluid under pressure.

17. The device of claim 16 wherein said flow supply line includes a pressure regulator.

18. The device of claim 14 wherein said conduits are arranged in a pattern functional to trap ferrous and tramp materials, attract and hold fine ferrous particles and allow free passage of bulk material sought to be conveyed.

19. The device of claim 18 wherein said housing includes means for removing and reinserting said magnetic bars either facilitating the removal of magnetically attracted tramp materials disposed on said grates or replacing the magnetic bars insertable in said conduits.

20. The device of claim 1 wherein said housing is attachable to the net and/or outlet of a rotary valve, a screw conveyor, or a flex auger, a bag dump station a bulk bag access hopper or another bulk material processing, storage or packaging apparatus.

* * * * *